Feb. 8, 1938.  H. HECHMAN  2,107,666
FOAM APPARATUS
Filed Aug. 23, 1935
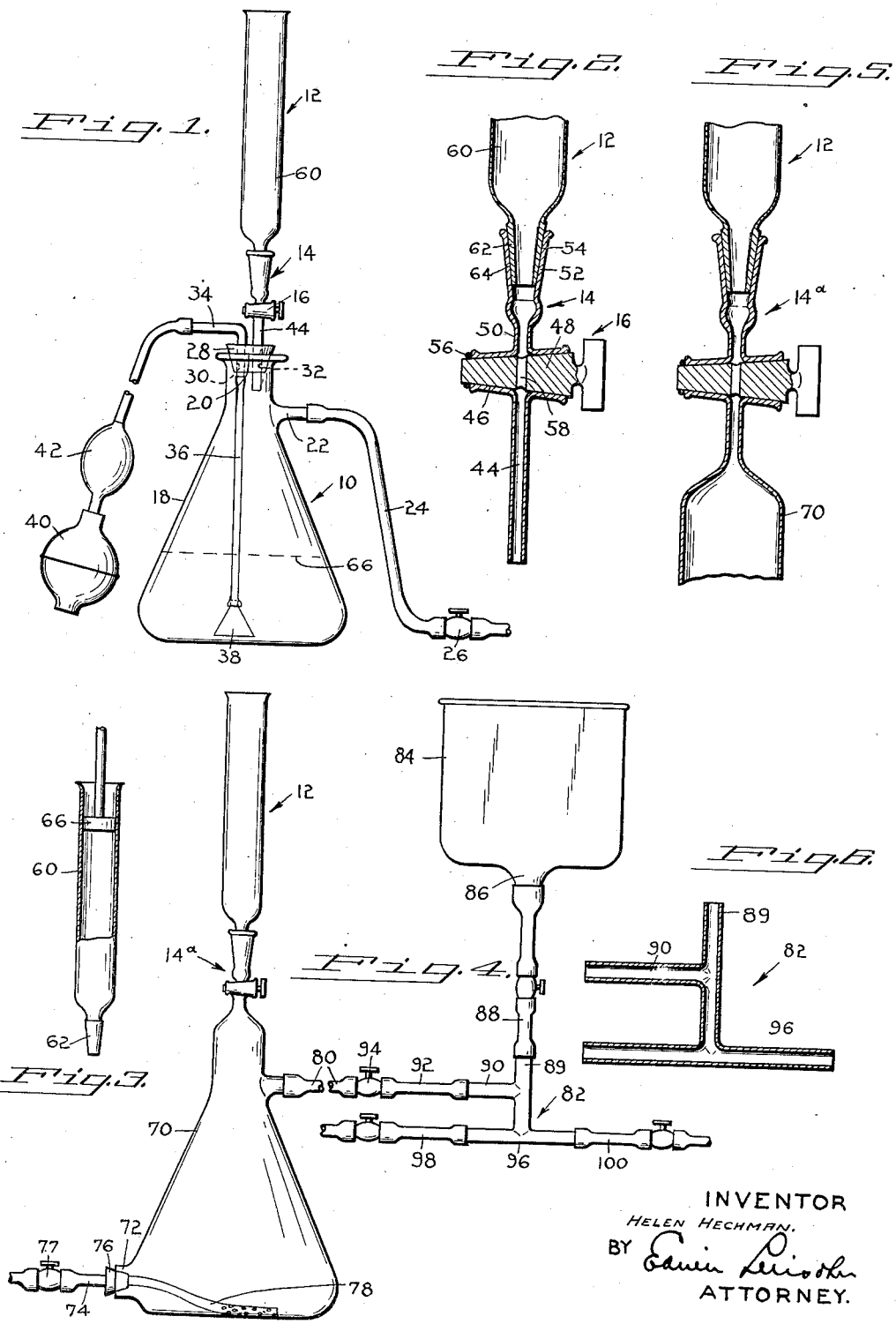
INVENTOR
HELEN HECHMAN.
BY
ATTORNEY.

Patented Feb. 8, 1938

2,107,666

UNITED STATES PATENT OFFICE 2,107,666

FOAM APPARATUS

Helen Hechman, New York, N. Y.

Application August 23, 1935, Serial No. 37,592

3 Claims. (Cl. 299—83)

The present invention relates to foam apparatus and more particularly to such apparatus for use in the practice of foam therapy and beauty culture.

One object of the invention is to improve and facilitate the technique in the utilization of foam for therapeutic use, beauty culture and similar purposes.

Another object of the invention is to provide foam apparatus by which foam possessing different physical characteristics may be generated.

A further object of the invention is to provide a foam generator with a foam receiver removably connected thereto.

A further object of the invention is to provide foam apparatus comprising a foam generator, a foam receiver therefor, and an improved coupling between said generator and said receiver.

Another object of the invention is to facilitate the utilization of foam in conjunction with other therapeutic apparatus.

The above objects of the invention and other objects ancillary thereto will be best understood from the following description considered in connection with the accompanying drawing forming a part of the present specification.

In the drawing:

Fig. 1 is a side view, in elevation, of an apparatus constituting one preferred embodiment of the invention;

Fig. 2 is an enlarged longitudinal sectional view of the coupling and a part of the foam receiver;

Fig. 3 is a side view of the foam receiver removed from the foam generator;

Fig. 4 is a side view, in elevation, of an apparatus illustrating another preferred embodiment of the invention;

Fig. 5 is an enlarged longitudinal sectional view of the coupling, an integral portion of the foam generator, and a part of the foam receiver;

Fig. 6 is an enlarged sectional view of a coupling between the foam apparatus and a colonic irrigator.

Referring to the drawing in detail, and first to the form of invention illustrated in Figs. 1 to 3, the apparatus of the present invention, as here shown, comprises a foam generator 10, a foam receiver 12, and a valved coupling 14 by which said foam receiver is removably connected to said generator for communication therewith under the control of the valve 16 of said coupling.

The foam generator 10 comprises a heat resistant flask 18 which is preferably made of transparent "Pyrex" glass. Said flask has a top opening 20 and a tubular outlet connection 22 disposed at the upper part of said flask below the opening 20. A flexible tube 24, preferably of rubber, is connected to said outlet extension 22 and is provided with a valve 26. A stopper 28, preferably of rubber, and provided with bores 30 and 32, is inserted within the opening 20 in the flask 18. An angular tube 34, preferably of glass, extends through the bore 30 in fluid tight relation therewith and constitutes part of a gas inlet for the foam generator. The gas inlet is completed by a tube 36, preferably of rubber, which is connected to the angular tube 34 below the stopper 28. The opposite end of said tube 36 may be closed by a block 38 of porous material such as porous stone, carbon or wood which will permit the passage of the gas therethrough in the form of fine streams. The gas may be supplied to the inlet tube 34 from any suitable source such as a cylinder of compressed air, oxygen, or carbon dioxide, and when the gas is air, the latter may be supplied by utilizing the compressible bulb 40 provided with a compressible equalizer chamber 42.

The coupling 14 is preferably made of glass and comprises a tubular portion 44 which is inserted through the bore 32 in the stopper 28, an intermediate tapered valve chamber 46 in which a valve plug 48 is rotatively mounted, a tubular portion 50 in communication with said valve chamber, and an outwardly flaring end portion 52 having an inner ground surface 54. The valve 48 is preferably of glass and has a ground surface to provide a fluid tight fit with the walls of the chamber 46. Said valve is prevented from moving out of said chamber by a collar 56 which preferably comprises a rubber band snugly embracing the projecting end of the valve 48 and abutting the adjacent end of the valve chamber. Said valve is provided with a transverse bore 58 which, when aligned with the conduit formed by the tubular portions 44 and 50, permits the passage of the foam or other fluids therethrough.

The foam receiver comprises a cylinder 60, which is preferably of transparent glass, and said cylinder is open at both ends and has a tapered neck portion 62 provided with a ground outer surface 64 adapted to be received within the socket formed by the flared end 52 of the coupling forming therewith a fluid tight joint.

In using the apparatus, the flask 18 is filled with a solution of saponin, or other suitable foam producing solution, to a suitable level indicated by the dotted line 66, and on the admission of a suitable gas such as air, oxygen, or carbon dioxide, through the aerator formed by the porous block 38, foam is generated within said flask. If wet or moist foam is desired, the valve 16 is closed and the foam is forced through the tube 24 by the pressure of the gas within the flask, the valve 26 being open. If dry foam is desired or if for any other reason the foam is to be accumulated within the receiver 12, the valve 26 is closed and the valve 16 is opened, whereby the foam passes through the conduit in the coupling 14 and into the glass cylinder 60. When the desired quantity of foam has accumulated within said cylinder, the valve 16 is closed and the cylinder may be removed from the coupling, and the foam may then be removed from said cylinder in any suitable manner, preferably through the neck 62 thereof by means of a plunger 66 inserted into said cylinder, as illustrated in Fig. 3.

In the form of the invention illustrated in Figs. 4 to 6, the foam apparatus is substantially the same as the foam apparatus illustrated in Fig. 1, with the exception that the coupling between the foam generator and the foam receiver is integral with said foam generator. Thus, referring to Fig. 4, the coupling designated generally by the reference character 14a is shown integral with the flask 70. Also as here shown, the flask has an inlet extension 72 adjacent the bottom of the flask and the gas is admitted through a tube 74 which extends through a rubber plug 76, a suitable length of the portion 78 of the tube within the flask being perforated to permit the passage of the gas therethrough for producing the foam from the foam producing solution contained within said flask. The inlet tube 74 may be provided with a valve 77. As here shown, the outlet tube 80 of the foam apparatus is connected to a coupling 82 of a colonic irrigator. Said irrigator comprises a vessel 84 constituting a reservoir for any suitable liquid and has a bottom outlet 86 which is connected to the inlet branch 89 of said coupling 82 by a valved tube 88. The foam supply tube 80 is connected to an inlet branch 90 of the coupling 82 preferably by a rubber tube 92 provided with a valve 94. The outlet branch 96 of the coupling 82 is connected to the valved tubes 98 and 100 in the usual manner. Thus, the apparatus here shown comprises means for entraining foam with the liquid supplied from the vessel 84, and the colonic irrigator in other respects may be used for its usual purpose well known to those skilled in the art. When foamless irrigation is desired, the valve 94 may be closed, while on the other hand when foam is to be entrained with the liquid from the vessel 84, said valve 94 is opened to permit foam to pass from the generator 70 into the coupling 82 together with the liquid from said vessel 84.

Thus it is seen that the embodiments of the invention disclosed herein are well adapted to accomplish the objects of the present invention. It will be understood, however, that the invention is not limited to the specific embodiments herein illustrated but may be embodied otherwise than as here shown, and that certain changes in the construction and arrangement of parts may be made in the illustrated constructions. Also, it will be understood that, while the apparatus of the present invention is especially useful in connection with foam therapy and the utilization of foam in the practice of beauty culture, said apparatus is not limited to such uses but may be used for other purposes. Accordingly, I do not wish to be limited to the precise constructions or to the uses of the apparatus herein specifically described, except as may be required by the appended claims and the prior art.

Having thus described my invention, what I desire to secure and claim by Letters Patent of the United States is:

1. Apparatus of the class described comprising a flask having an opening at its top, a stopper having two bores therethrough inserted in said flask, a gas inlet tube extending into said flask through one of said bores to a point near the bottom of the flask, an outlet tube extending into said flask through the other bore in said stopper, a foam receiver connected to said last mentioned tube, said flask having an outlet opening below said stopper, and valve means to control the flow of foam alternatively through either said outlet tube or said opening below the stopper.

2. Apparatus of the class described comprising a foam generator, an outlet tube therefor, a liquid reservoir, an outlet tube for said reservoir, a coupling provided with inlet branches connected, respectively, to said foam generator outlet tube and said reservoir outlet tube, and having an outlet for the foam and liquid received by said coupling through said inlet branches.

3. Apparatus of the class described comprising a foam generator, an outlet tube therefor, a liquid reservoir, an outlet tube for said reservoir, a coupling provided with inlet branches connected, respectively, to said foam generator outlet tube and said reservoir outlet tube, and having an outlet for the foam and liquid received by said coupling through said inlet branches, and valve means controlling the flow into said coupling inlet branches.

HELEN HECHMAN.